March 5, 1946.   F. C. KETHCART   2,395,897
PINKING SHEARS
Filed April 29, 1943   2 Sheets-Sheet 1
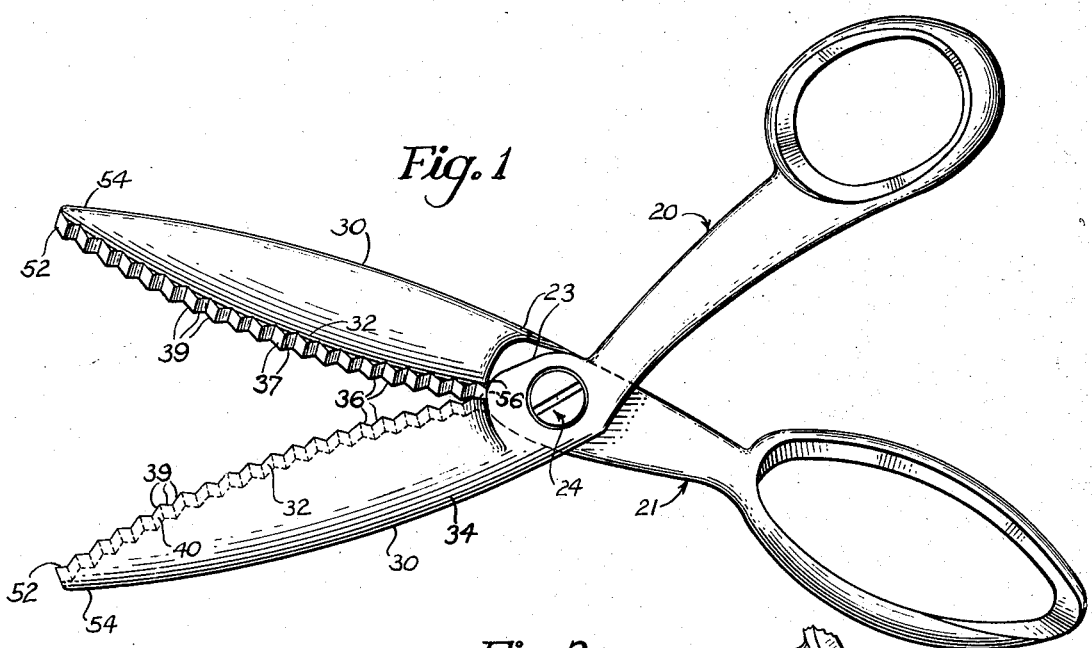
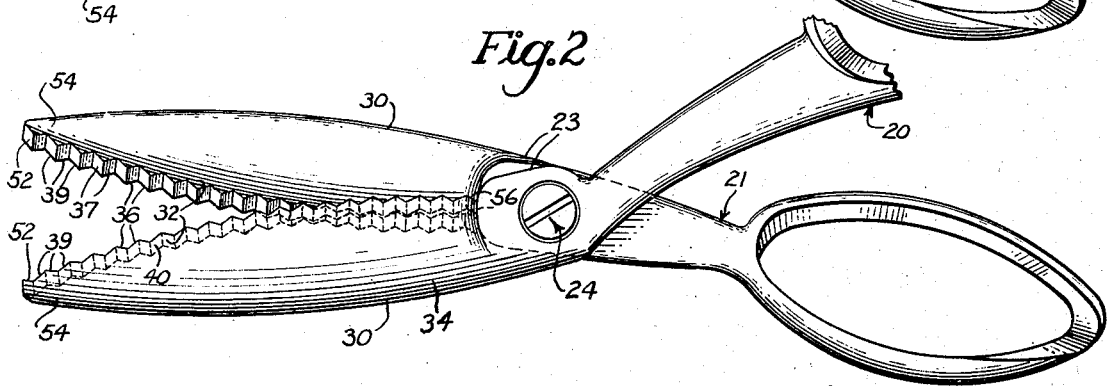
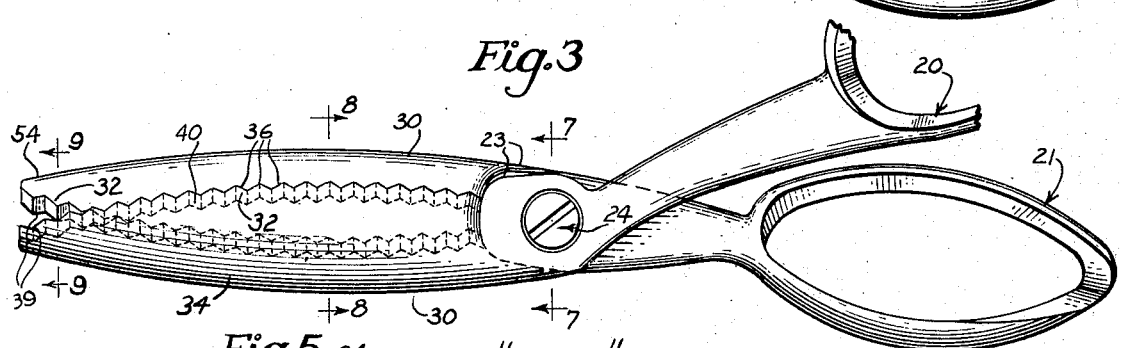
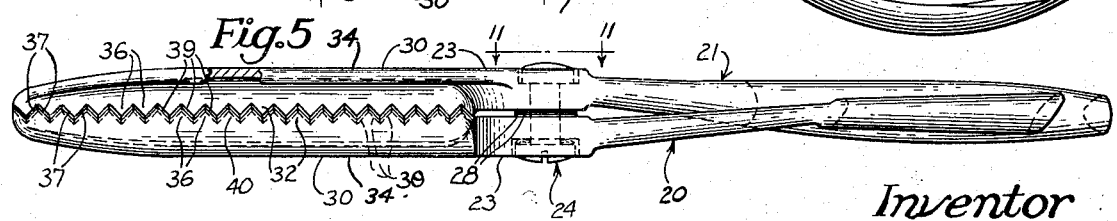
Inventor
Frank C. Kethcart
by: Louis Sheldon
Robert N. Burton
Attys.

March 5, 1946.  F. C. KETHCART  2,395,897
PINKING SHEARS
Filed April 29, 1943  2 Sheets-Sheet 2
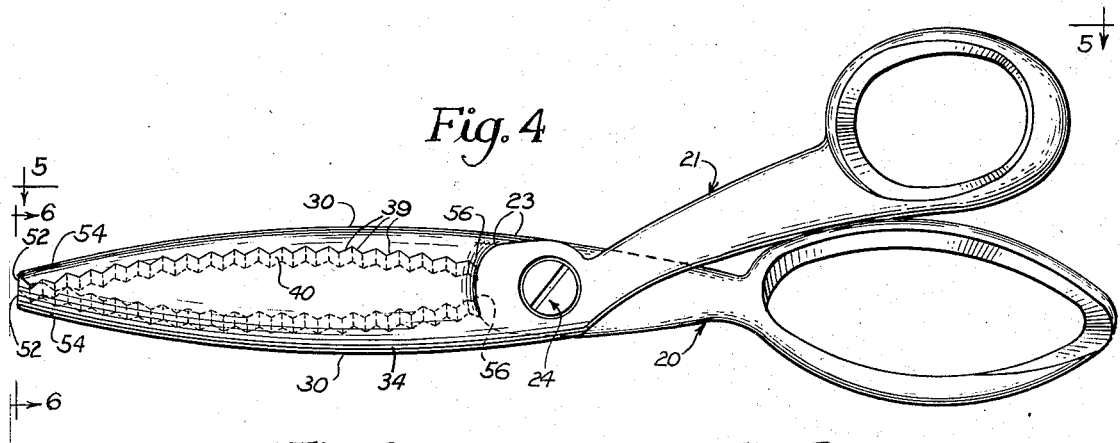
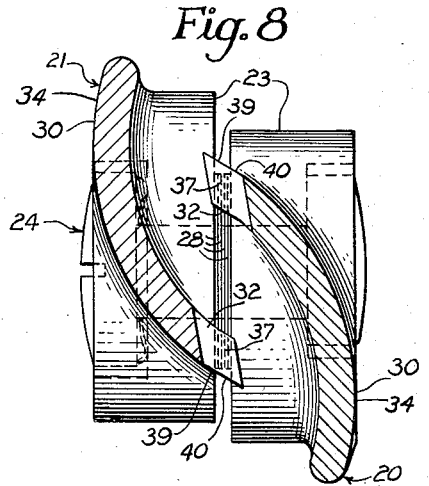
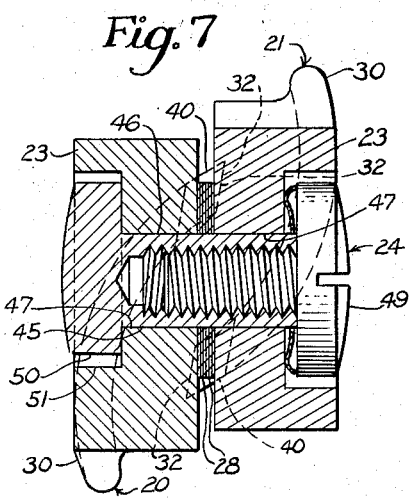
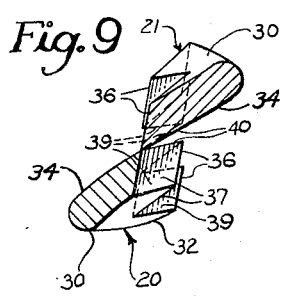
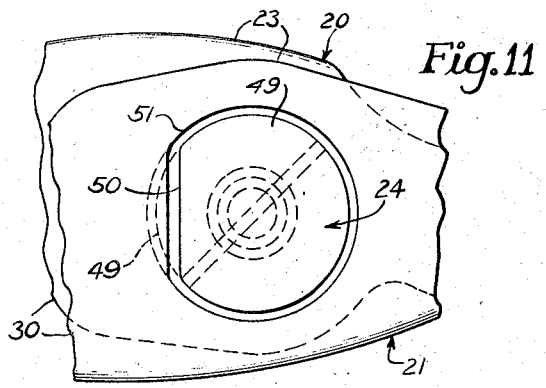
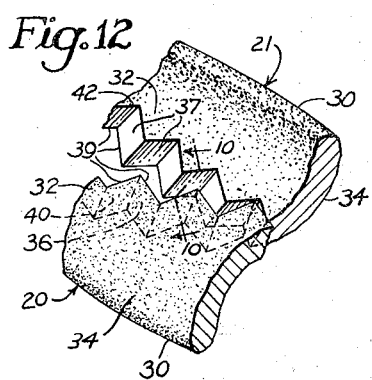
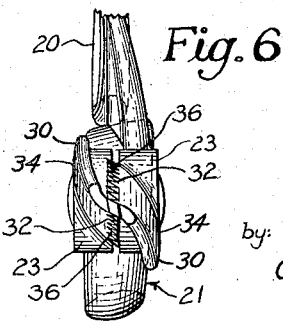
Inventor
Frank C. Kethcart
by: Louis Sheldon
Robert N. Burton
Attys.

Patented Mar. 5, 1946

2,395,897

UNITED STATES PATENT OFFICE 2,395,897

PINKING SHEARS

Frank C. Kethcart, Chicago, Ill., assignor to Sears, Roebuck and Co., Chicago, Ill., a corporation of New York Application April 29, 1943, Serial No. 484,967

11 Claims. (Cl. 30—230)

This invention has to do with pinking appliances such as pinking shears.

Known devices of this type, especially those used in dressmaking, are unsatisfactory for the reasons, among others, that an initial cut must be made with plain shears before the pinking shears can commence cutting, due to the fact that known pinking shears grip the cloth in advance of the cutting point and therefore cannot readily release the cloth without pulling threads or damaging the material; they cannot very easily cut short distances and turn sharp corners such as is often necessary in cutting dress and other patterns; and they do not cut properly at the teeth adjacent the free ends of the blades, due to the smallness of the angle between the rows of teeth at such points and the correspondingly reduced lateral spring pressure between the teeth at such points because of their remoteness from the pivot axis.

It is accordingly an object of my invention to provide a pinking shears in which the above noted, among other, disadvantages are obviated.

Further objects and advantages will appear as the description proceeds.

The invention will be better understood upon reference to the following description and the accompanying drawings, in which:

Figs. 1, 2, 3 and 4 are side elevational views of a pinking shears embodying features of my invention, with the cutting blades in different relations.

Figs. 5 and 6 are respectively top edge and end elevational views taken as indicated by the lines 5—5 and 6—6 in Fig. 4.

Figs. 7, 8 and 9 are enlarged sectional views taken respectively as indicated by the lines 7—7, 8—8 and 9—9 in Fig. 3.

Fig. 10 is an enlarged fragmentary sectional view taken as indicated by the line 10—10 in Fig. 12.

Fig. 11 is a fragmentary side elevational view taken as indicated by the line 11—11 in Fig. 5.

Fig. 12 is an enlarged fragmentary perspective view showing the co-action between the cutting teeth.

An illustrative pinking shears embodying features of my invention may comprise complemental thumb and finger blade members 20 and 21 having intermediate hub portions 23 pivotally connected together as shown generally at 24, said portions being adjustably spaced apart as by shims 28. Extending outwardly from the hub portions are blades 30, each preferably being of concavo-convex substantially arcuate cross-section permitting the use of relatively thin gage steel affording adequate strength and giving an attractive and unusual appearance, and having a marginal serrated shearing portion 32 which may be transversely curved or substantially flat if desired.

The teeth 36 are identical for both blades, each row of teeth being formed by broaching, milling, grinding or other suitable operation or operations, the angularly related tooth walls 37 between the convex and concave surfaces of each blade preferably being flat. Each cutting edge 39 is at the juncture of a tooth wall 37 with the outer or shearing surface 40 of the marginal cutting portion 32 of each blade, said wall and surface forming an angle which is preferably substantially 50°, the surface 40 preferably being disposed at an angle of substantially 60° to a plane normal to the pivot axis of said blade, as shown. The angles noted may be greater or less but in any event are such as to afford the necessary attributes including clearance in view of the fact that the teeth have arcuate movement about the pivot 24 so that each cutting edge 39 will clear the entire or a sufficient portion of the complemental opposite blade tooth to an extent precluding binding or wedging of the pinked cloth or other material between juxtaposed or meshed tooth walls.

In known pinking shears the shearing surfaces are disposed in planes normal to the direction of cutting motion of the blade, i. e., normal to a plane which is itself normal to the pivot axis, and the material as it is being engaged by the cutting edges tends to wedge or pry the blades laterally apart, since the blades offer little resistance to such movement thereof. This action weakens the pivot and promotes permanent springing apart of the blades and accordingly such shears require frequent adjustment. In the instant device these disadvantages are overcome due to the inclination of the surface 40 of each blade to the direction of relative movement of the blades and the facing of such surface on the right blade to the right and the facing of such surface on the left blade to the left. The material being cut might tend to wedge or pry apart the blades, but the blades are most readily yieldable in directions substantially normal to the shearing surfaces 40 and the components of the wedging or prying force are such that the teeth actually are urged closer together, thereby causing them to effect a cleaner cutting of the material and promoting the close cooperation of the teeth which is conducive to self-sharpening and optimum cutting results and substantially reduces the necessity for readjustment at the pivot. The inclination of the shearing portions 32 is selected for maximum strength of the teeth and blades as a whole with minimum thickness of material.

In known pinking shears of the type under consideration, the teeth are arranged in series or rows non-radial to the pivot axis. Such construction requires the rearmost teeth to be spaced considerably forward of the pivot in order that the angle between the rows of teeth when such rearmost teeth meet may be small enough to insure the proper cutting of the material. This space is occupied by metal which is not only expensive but is an added weight in a tool which at best is rather heavy, especially for women. This metal must be quite heavy for strength because of the additional torque burden placed on the pivot and on the blades by reason of the added overall length of the blades forward from the pivot for a given cutting length, said added length lessening the resistance to springing apart. In the construction illustrated, the rows of teeth are convex and the rearmost teeth are immediately adjacent the pivot hub, and when said rearmost teeth are in cutting positions the rows of teeth are at a proper cutting angle, thereby eliminating a substantial quantity of expensive and heavy metal, and also eliminating the need for an unduly strong pivot and permitting the use of shorter blades for the same length of cut or enabling a longer cut to be made with blades of conventional length, and permitting the use of blades longer than conventional blades and of relatively thin gage metal which further reduces the weight of the device and hence fatigue from use.

Shears embodying my invention may be made from any suitable metal such as tool steel employed in pinking shears of conventional design.

The pivots 24 may be of any suitable construction, such, for example, as a bushing 45 case-hardened or otherwise hardened at 46 for bearing engagement with the hardened surfaces of the bores 47 of the blades, a screw 49 being threaded into the bushing. The bushing may have a head with a flat side 50 fitting in a similarly shaped recess 51 to prevent relative turning.

It will be observed that each row of teeth not only radiates from the pivot axis, but that the row itself is curved. Where the rows of teeth are substantially straight, the portions thereof adjacent the free ends of the blades meet at relatively and progressively smaller angles, and the lateral pressure forcing the cooperating teeth toward each other progressively decreases away from the pivot, with the result that the teeth at such points tend to grip rather than cut the cloth or other material. One way of overcoming this drawback might be to shorten the blades so as to insure the proper pressure and angle for cutting at the free ends of the blades. However, such a solution would be unsatisfactory because it would correspondingly increase the number of cutting movements of the hand and more readily tire the operator as well as increase the time to perform a given task. A pinking shears constructed with the rows of teeth convexly curved in accordance with my invention may have as many teeth as or more teeth than the conventional shears with less or the same blade length and yet insure proper cutting to the very tips 52 of the outer or free ends 54 of the blades as well as at all other points. For this reason the rows of cutting teeth are convexly curved in such manner that the angle between the teeth is substantially uniform as the closing of the shears progresses. The inner ends 56 of the rows of teeth, while spaced apart when the shears is closed, are sufficiently close to provide a proper cutting angle when the rearmost teeth meet.

Various modifications may suggest themselves to those skilled in the art without departing from the spirit of my invention and, hence, I do not wish to be restricted to the specific form shown or uses mentioned, except to the extent indicated in the appended claims.

I claim:

1. A pinking tool comprising pivotally connected right and left blades each having a convex row of cutting teeth, the cutting edges of said teeth of each blade defining a surface inclined to a plane normal to the pivot axis, said surface on the right blade facing to the right and said surface on the left blade facing to the left.

2. A pinking shears comprising pivotally connected thumb and finger blades having serrated cutting edges arranged in convex rows, the portions of said rows adjacent the pivot axis converging toward said axis when said blades are closed, said rows intersecting at a substantial angle to each other throughout the entire shearing operation, each of said edges defining a surface inclined to the planes of cutting movement of said blades, said surface on each blade facing away from the other blade.

3. A pinking shears comprising blades connected by a single pivot and having convex serrated cutting edges, each of said edges defining a surface inclined to a plane normal to the pivot axis, the inclination of each blade facing away from the other blade, said edges converging to points immediately forward of the pivot when said blades are closed and being arranged to extend at an angle to each other suitable for efficient cutting when said points meet as well as at all other meeting points of said edges when said blades are open.

4. In a pinking tool, cooperating blades of substantially curved cross-section having serrated cutting margins inclined to a plane normal to the pivot axis, the outer surface of said margin of each blade facing away from the other blade, the rows of teeth being convex and converging to points immediately forward of said axis when said blades are closed, the projected width of the blades on said plane when said blades are closed approximating that of one of said blades.

5. A pinking shears comprising pivotally connected blades of curved cross-section with convex rows of teeth, said rows, when said blades are closed, converging toward and terminating adjacent each other immediately forward of the pivot.

6. In a pinking tool, cooperating blades pivoted together and having serrated convex rows of cutting teeth, said rows approaching each other adjacent the pivot when said blades are closed, each tooth having two intersecting flat walls, each blade having a cutting surface disposed at an acute angle to each of said walls, providing a sharp serrated cutting edge at the juncture of said surface with said walls, said walls of each tooth receding from said cutting surface toward the opposite surface of such tooth in a direction away from the other blade to provide clearance for the proper intermeshing therewith of the other blade.

7. In a pinking tool, cooperating blades pivoted together and having serrated convex rows of cutting teeth, said rows approaching each other adjacent the pivot when said blades are closed, each tooth having two intersecting flat walls, each blade having a cutting surface disposed at an acute angle to each of said walls, providing a sharp serrated cutting edge at the juncture of said surface with said walls, said walls of each tooth receding from said cutting surface toward the opposite surface of such tooth in a direction away from the other blade to provide clearance for the proper intermeshing therewith of the other blade, the free corners of said edge in operation being movable substantially in a plane, said surface at said edge being inclined and facing away from the other blade.

8. In a pinking tool, pivotally connected blades having serrated convex rows of cutting teeth, said walls approaching each other adjacent the pivot when said blades are closed, each tooth having two intersecting flat walls, each blade having a cutting surface disposed at an acute angle to each of said walls, providing a sharp serrated cutting edge at the juncture of said surface with said walls, said walls of each tooth receding from said cutting surface toward the opposite surface of such tooth in a direction away from the other blade to provide clearance for the proper intermeshing therewith of the other blade, the free corners of said edge in operation being movable substantially in a plane, said surface at said edge being inclined and facing away from the other blade, each blade being curved in cross-section along the toothed portion thereof, said cutting surface being on the convex side of said cutting portion.

9. A pinking tool comprising a pair of pivotally connected blades having serrated convex rows of teeth, said rows approaching each other adjacent the pivot when said blades are closed, the toothed portions of said blades being arcuate in cross-section and arranged so that, wherever said blades are meshed, the composite cross-section of said portions is substantially S-shaped, each serrated cutting edge defining an inclined surface facing away from the other blade.

10. A pinking tool comprising pivotally connected right and left blades each having a convex row of cutting teeth, said rows approaching each other adjacent the pivot when said blades are closed, the cutting edges of said teeth of each blade defining a surface inclined to a plane normal to the pivot axis, said surface on the right blade facing to the right and said surface on the left blade facing to the left.

11. A pinking shears comprising pivotally connected blades with convex rows of teeth, said rows, when said blades are closed, converging toward and terminating adjacent each other and immediately forward of the pivot.

FRANK C. KETHCART.